US012801650B2

(12) United States Patent
Zhou et al.

(10) Patent No.: US 12,801,650 B2
(45) Date of Patent: Nov. 17, 2026

(54) TEXT SEQUENCE RECOMMENDATION METHOD AND SYSTEM BASED ON LARGE LANGUAGE MODEL

(71) Applicant: Jinan University, Guangzhou (CN)

(72) Inventors: Zhibo Zhou, Guangzhou (CN); Zhenghang Yang, Guangzhou (CN); Zhi Li, Guangzhou (CN); Shaojun Xie, Guangzhou (CN); Feiran Huang, Guangzhou (CN)

(73) Assignee: Jinan University, Guangzhou (CN)

( * ) Notice: Subject to any disclaimer, the term of this patent is extended or adjusted under 35 U.S.C. 154(b) by 0 days.

(21) Appl. No.: 19/365,283

(22) Filed: Oct. 22, 2025

(65) Prior Publication Data

US 2026/0140985 A1 May 21, 2026

(30) Foreign Application Priority Data

Nov. 20, 2024 (CN) ......................... 202411660991.6

(51) Int. Cl.
*G06F 16/334* (2025.01)
*G06F 40/166* (2020.01)

(52) U.S. Cl.
CPC ........ *G06F 16/3347* (2019.01); *G06F 40/166* (2020.01)

(58) Field of Classification Search
CPC ........................... G06F 16/3347; G06F 40/166
See application file for complete search history.

(56) References Cited

U.S. PATENT DOCUMENTS

2025/0005294 A1* 1/2025 Ochs ..................... G06F 40/166

FOREIGN PATENT DOCUMENTS

| | | | |
|---|---|---|---|
| CN | 117390290 | A | 1/2024 |
| CN | 118261670 | A | 6/2024 |
| CN | 118734177 | A | 10/2024 |
| WO | WO2022088444 | A1 | 5/2022 |

* cited by examiner

*Primary Examiner* — Tony Mahmoudi
*Assistant Examiner* — Nirav K Khakhar
(74) *Attorney, Agent, or Firm* — Nitin Kaushik

(57) ABSTRACT

A text sequence recommendation method and system based on a large language model is disclosed, belonging to the technical field of recommendation algorithms. The method includes: a data preprocessing stage, a large language model pre-training stage, a sequence model fine-tuning stage and a matching stage. According to this disclosure, a large language model is introduced into a text sequence recommendation task, so that text can be better modeled by utilizing rich pre-training corpus of the large language model; meanwhile, sequence modeling is performed on the text, the capability of sequence recommendations modeling in a large model is activated, an ID-based recommendation paradigm in a traditional recommendation algorithm is eliminated, and recommendation task learning processing is better performed in a cold start scenario and a knowledge transfer scenario; and finally, a recommendation result is finally optimized by a sequence model.

8 Claims, 5 Drawing Sheets

TEXT SEQUENCE RECOMMENDATION METHOD AND SYSTEM BASED ON LARGE LANGUAGE MODEL

CROSS-REFERENCE TO RELATED APPLICATIONS

The application claims priority to Chinese patent application No. 2024116609916, filed on Nov. 20, 2024, the entire contents of which are incorporated herein by reference.

TECHNICAL FIELD

This disclosure relates to the technical field of recommendation algorithms, and in particular, to a text sequence recommendation method and system based on a large language model.

BACKGROUND

In recent years, with the rapid development of computer technology, the Internet and related industries, a large amount of text-based data is generated on the Internet every day, showing the characteristics of big data. At the same time, artificial intelligence content generation technology is also developing rapidly, further accelerating the emergence of data information. How to quickly filter out the content that everyone is really interested in from such a huge amount of data has promoted the research of recommendation systems. Recommendation system is a technology that uses user behavior data and text information to provide users with personalized recommendations. It analyzes users' historical behavior and text features, uses algorithm models to predict content that users may be interested in, and makes recommendations. Such systems are widely used in text-based fields, such as news push, e-book recommendations, academic article retrieval, etc., aiming to improve user experience, enhance user stickiness, and promote the effective dissemination of content. The development of recommendation systems not only has a significant impact on users and businesses, but also provides rich practical opportunities for research and application in the fields of information technology and artificial intelligence.

As an important scenario in recommendation systems, sequence recommendation has always received widespread attention. In recommendation systems, the temporal information of user behavior is crucial. For user's next behavior prediction, whether a user's past behavior sequence can be effectively utilized is directly related to the accuracy of recommendations and user experience. The key to solving the sequential recommendation problem is to infer users' preferences from their historical behavior sequences through a series of technical means, and to perform personalized recommendations or searches based on the order of their behaviors. The existing method has the problems in sequential recommendation scenarios, such as insufficient use of text information in historical behavior information by ID-based coding logic, misalignment between behavior sequence pattern and recommendation algorithm space, and inaccurate recommendation due to the large language hallucination problem when using a large language model.

SUMMARY

An objective of this disclosure is to provide a text sequence recommendation technology based on a large language model in order to solve the above problems, which aims to overcome the defect of insufficient utilization of historical text content information in a text sequence recommendation scenario, and achieve a better recommendation effect by activating the sequence recommendation capability of the large language model and performing optimization in semantic space and vector space simultaneously and then alleviating the influence of the hallucination problem caused when the large model preforms a recommendation task.

This disclosure provides a text sequence recommendation method based on a large language model in order to achieve the above technical objective, including the following stages:

- a data preprocessing stage: converting historical text sequence data clicked by a user into an attribute key-value pair set to construct a dataset for large model training;
- a large language model pre-training stage: constructing the dataset into a prompt word training set for the large language model, and converting a sequence recommendation task into a natural language task and then model training is performed to obtain an optimal text sequence recommendation result at a semantic space level;
- a sequence model fine-tuning stage: fine-tuning a sequence model, so that a result based on the large language model is optimized for the sequence recommendation task; and
- a matching stage: matching text content in an embedding vector space dimension based on the processing results of the large language model stage and the sequence model stage, and outputting a sequence recommendation result.

Preferably, in the data preprocessing stage, the historical text sequence data is processed by removing punctuation marks, removing HTML tags, removing stop words, removing redundant spaces and performing word form restoration; and

- the processed data is constructed into a format including attribute keys and values, and is ranked in reverse order of interaction time, and an interaction sequence with more than 5 interactions is selected as the dataset.

Preferably, in the large language model pre-training stage, a missing corpus prompt dataset is constructed by masking values in a certain sequence within the interaction sequence;

- a contrastive learning prompt dataset is constructed based on user interacted text data and non-interacted text data; and
- the prompt word training set is constructed according to the fact that the missing corpus dataset and the contrastive learning prompt dataset are divided in a ratio of training set:validation set:test set of 8:1:1.

Preferably, in the large language model pre-training stage, a low-rank matrix is used as a supplement to fine-tuning parameters of a large model, and original parameters are merged with parameters of the low-rank matrix to form the overall parameters of the large language model for model training.

Preferably, in the large language model pre-training stage, a goal of training the large model is:

$$\max \sum_{x,y\in Z} \sum_{t=1}^{|y|} \log\left(P_u(y_t|x,\ y_{<t})\right);$$

where x represents the given task, $y_t$ is the large model output, $y_{<t}$ represents the output content between the large model output $y_r$, and $P_u$ represents the overall parameters of the large language model.

Preferably, in the sequence model fine-tuning stage, Langformer is used as the sequence model to prevent an excessively long interaction sequence from affecting a calculation result and to improve the calculation efficiency of an attention mechanism.

Preferably, in the sequence model fine-tuning stage, a reference vector is selected, a vector trained by the large language model is used as a positive sample of the reference vector, and a vector not trained by the large language model is used as a negative sample of the reference vector; and based on the reference vector, according to the positive sample and the negative sample, by setting a perturbation factor, a contrastive learning Loss function is constructed for fine-tuning a downstream task, where the contrastive learning Loss function is expressed as:

$$L_c = -\min \sum_{i=1}^{N} [\|E_{final} - E_{D_{pos}}\|^2 - \|E_{final} - E_{D_{neg}}\|^2 + \alpha_1];$$

where $E_{final}$ represents the reference vector, $E_{D_{pos}}$ represents the positive sample, $E_{D_{neg}}$ represents the negative sample, $\alpha_1$ represents the perturbation factor, and $L_c$ represents the contrastive learning Loss function.

Preferably, in the process of fine-tuning the downstream task, a multilayer perceptron is used as the downstream task and is transferred using a cross entropy Loss, where the cross entropy Loss is expressed as:

$$L_b = -\sum_{i=1}^{n} (y_i \log(\hat{y}_i) + (1 - y_i) \log(1 - \hat{y}_i));$$

where n is the number of samples, $y_i$ is the actual click behavior, which is 1 if clicked, and is 0 if not clicked, and $\hat{y}_i$ is the prediction probability of the model output;

for the sequence model, the fine-tuning overall Loss function is: $L=L_b+L_c$.

Preferably, in the matching stage, text data to be recommended is obtained, reasoning is performed by the large model to obtain an output result of the large model, the output result and an embedding vector set of the text data to be recommended are reasoned using a downstream task model, and final text recommendation is performed according to a cosine similarity between a reasoning result and a vector in the embedding vector set to be recommended.

This disclosure discloses a text sequence recommendation system based on a large language model, wherein the system is configured to execute the above-mentioned text sequence recommendation method based on a large language model, the system including:

a data preprocessing module, configured to convert historical text sequence data clicked by a user into an attribute key-value pair set to construct a dataset for large model training;

a large language model pre-training module, configured to construct the dataset into a prompt word training set for the large language model, and convert a sequence recommendation task into a natural language task and then model training is performed to obtain an optimal text sequence recommendation result at a semantic space level;

a sequence model fine-tuning module, configured to fine-tune a sequence model, so that a result based on the large language model is optimized for the sequence recommendation task; and a matching stage module, configured to match text content in an embedding vector space dimension based on the processing results of the large language model stage and the sequence model stage, and output a sequence recommendation result.

This disclosure has the following technical effects.

According to this disclosure, a large language model is introduced into a text sequence recommendation task, so that more comprehensive training corpus of the large language model can be utilized, and the utilization of text information in historical behavior information can be enhanced; meanwhile, based on contrastive learning and sequence construction prompts, the sequence recommendation capability of the large language model is stimulated. In view of the previous problems such as misalignment between sequence pattern and recommendation algorithm space, as well as large language model hallucination, etc., according to this disclosure, a sequence model is introduced to perform fine-tuning and optimization at the vector level, which can effectively match different spaces and perform vector fitting, thereby alleviating the problem of large language model hallucination and effectively improving the performance of text sequence recommendation.

BRIEF DESCRIPTION OF DRAWINGS

In order to more clearly illustrate the embodiments of this disclosure or the technical solutions in the prior art, the drawings to be used in the embodiments will be briefly introduced below. Obviously, the drawings described below are only some embodiments of this disclosure. Ordinary technicians in this field can obtain other drawings according to these drawings without paying creative work.

DETAILED DESCRIPTION OF THE EMBODIMENTS

In order to make the objectives, technical solutions and advantages of the embodiments of this disclosure clearer, the technical solutions in the embodiments of this disclosure will be clearly and completely described below in conjunction with the drawings in the embodiments of this disclosure. Obviously, the described embodiments are only some, rather than all of the embodiments of this disclosure. The components of the embodiments of this disclosure, as generally described and illustrated in the figures herein, may be arranged and designed in a wide variety of different configurations. Therefore, the following detailed description of the embodiments of this disclosure provided in the accompanying drawings is not intended to limit the scope of this disclosure for protection, but merely represents selected embodiments of this disclosure. Based on the embodiments of this disclosure, all other embodiments obtained by those skilled in the art without making any creative efforts shall fall within the scope of protection of this disclosure.

Figure 2:
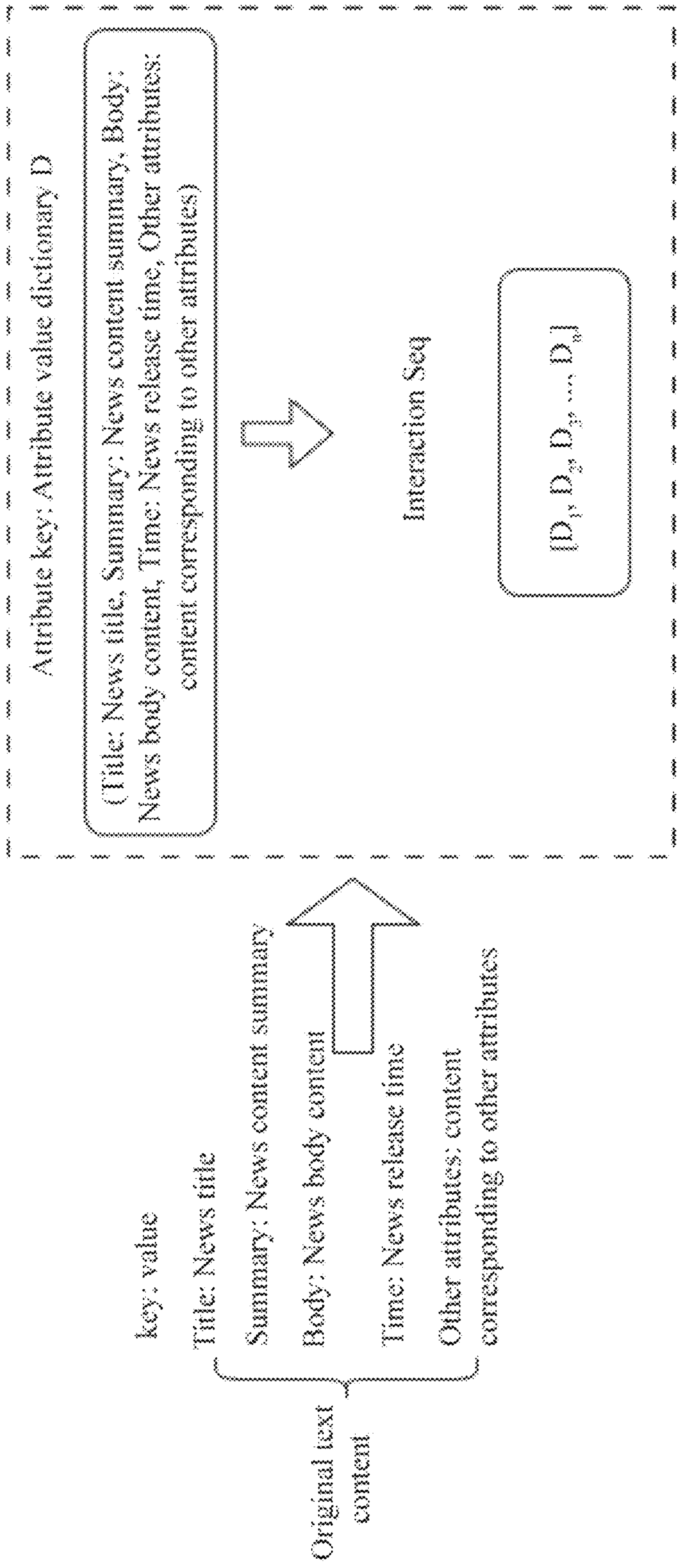
FIG. 2 is a schematic diagram of training data processing according to this disclosure.

As shown in FIGS. 1-5, the main steps of the text sequence recommendation algorithm technology based on a large language model provided by this disclosure are as follows: training data preprocessing, large language model training, sequence model fine-tuning, and sequence recommendation result matching; and specific details include the following:

S1. Training Data Preprocessing:

based on text content clicked by a user, historical text sequence data clicked by the user is constructed, and a recommended sequence text dataset required in the subsequent steps is constructed by converting the historical text sequence data into an attribute key-value pair set, where each text is represented by an attribute dictionary, which includes different attribute feature information of the text, and the final processing process is shown in FIG. 2.

S1.1. Training Data Preprocessing:

collected training data is processed, including: punctuation marks are removed: punctuation marks are removed from text to reduce noise; HTML tags are removed: if the captured text contains HTML tags, the HTML tags are cleaned up using regular expressions or an HTML parser (such as BeautifulSoup); stop words are removed: stop words (such as "the", "is", etc.) may not be helpful for a task, and these words are removed to reduce input dimensions; redundant spaces are removed: there may be redundant spaces or line breaks in the text, which should be cleaned up uniformly; and word form restoration (lemmatization) is performed: a word may be restored to its dictionary form, for example, "running" becomes "run". A word form restoration tool in spaCy or NLTK may be used.

Figure 1:
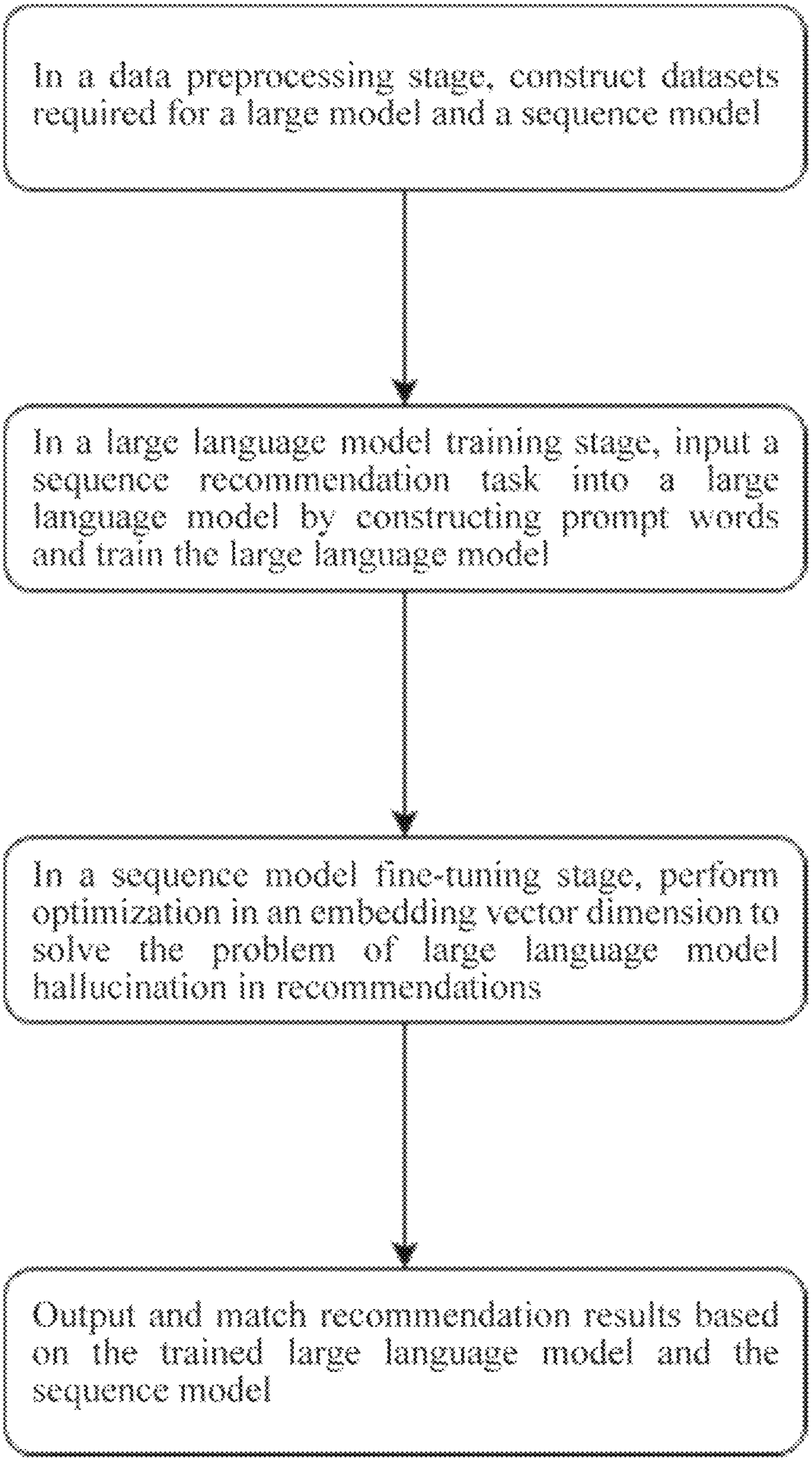
FIG. 1 is a flow chart of steps of a method according to this disclosure.

S1.2. Construction of a Text Sequence Key-Value Pair Dataset:

based on the data processed in step S1.1, a text sequence key-value pair dataset is constructed according to the task; and for the text data clicked by the user, the data is constructed into a dictionary value of {attribute key 1: value 1; attribute key 2: value 2; . . . attribute key n; value n}, denoted as D. The $i^{th}$ attribute key and value are represented by Keyi and $Value_i$, and are ranked in reverse order of interaction time. For a user, a user interacted text sequence is a sequence composed of D, denoted as Seq (DE Seq). The overall data processing flow is as shown in FIG. 1. For each user, the length of a user interacted sequence is not necessarily the same. An interaction sequence with more than 5 interactions is selected as the final dataset in order to reduce the impact of insufficient interaction on model training.

Figure 3:
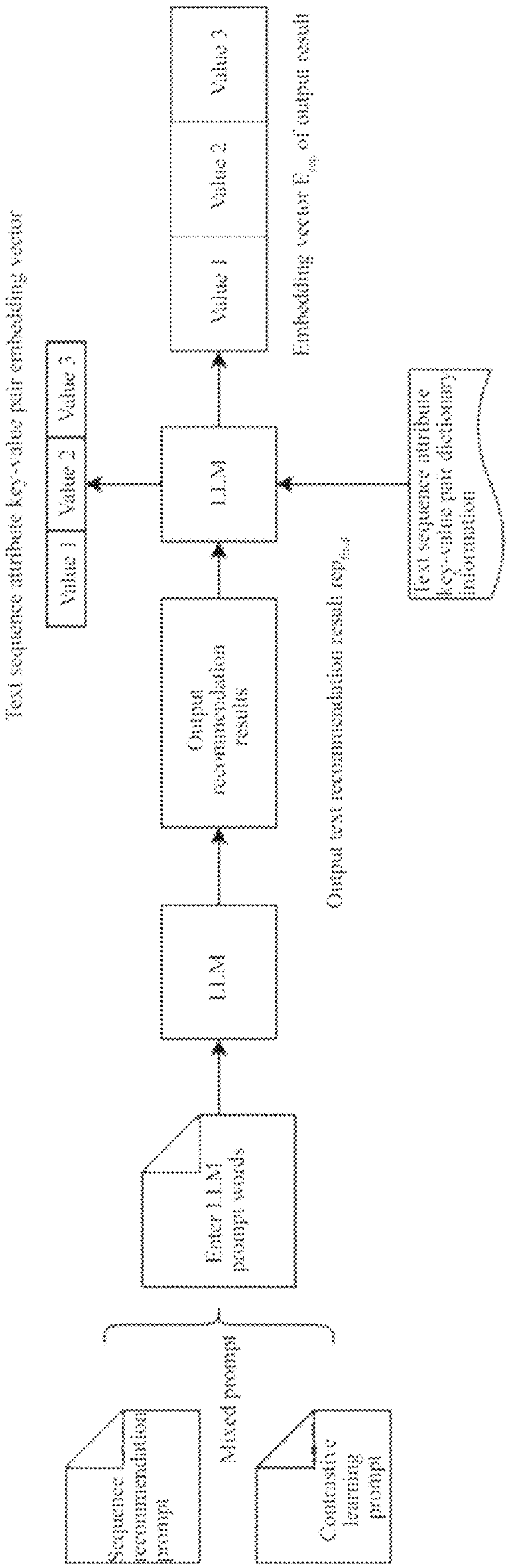
FIG. 3 is a schematic diagram of a large language model training process according to this disclosure.

S2. Large Language Model Training:

as shown in FIG. 3, based on the dataset obtained in step S1, a prompt word training set of the large language model is constructed, a sequence recommendation task is converted into a natural language task, and the large language model is pulled for training to obtain an optimal text sequence recommendation result at a semantic space level.

S2.1. Large Language Model Acquisition:

large language models are usually divided into two types: open-source model and paid model. Open-source models are usually model weights, such as Meta's Lima series and Ali's Qwen series. Paid models are usually invoked via API interfaces, such as OpenAI's ChatGPT series. In this disclosure, taking the Llama series as an example, fine-tuning can be made to the other large language models, and the obtained original large model parameters can be represented as L0.

S2.2. Construction of a Large Language Model Training Prompt Word Dataset:

large model prompt words are constructed using the dataset constructed in step S1.2; a missing corpus prompt dataset is constructed by masking values in a certain sequence within the interaction sequence, denoted as $C_q$. Masking certain content in the sequence is completed by the large language model, which can significantly improve the learning capability of the large language mode for the sequence content. For $prompt_{mask} \in C_q$, the constructed features are as follows:

Q: The user has interacted with the following text content. The content ranked in reverse order of interaction time is [$Seq_{mask}$]. Please predict the missing content;

A: The complete sequence data the user has interacted with is [Seq];

In the above content, $Seq_{mask}$ is a complete text interaction sequence to be supplemented after masking certain positions, and Seq is a complete user interacted text sequence.

A contrastive learning prompt dataset is constructed according to user interacted text data and non-interacted text data, denoted as Cc. By constructing a contrastive learning prompt at the text level, the core idea of contrastive learning, "bringing similarities closer and dissimilarities further apart," is instilled into the large language model through natural language. For $prompt_{C_e} \in Cc$ in the contrastive learning prompt dataset, the constructed features are as follows:

The user clicked on item [$D_i$] and also clicked on item [$D_j$], but did not click on item [$D_k$];

The missing corpus dataset and the contrastive learning prompt dataset are divided in a ratio of training set:validation set:test set of 8:1:1. The training set, validation set, and test set are represented by $T_{cq}$, $T_{cc}$, $V_{cq}$, $V_{cc}$, $T_{cq}$, and $T_{cc}$ respectively.

S2.3. Training of Large Language Model According to the Prompt Dataset:

for the original large model $L_o$, fully training its parameters is a time-consuming and labor-intensive task. A low-rank matrix is used as a supplement to fine-tuning parameters of the large model in order to facilitate fine-tuning training. The principle of the LoRA method is to use rank decomposition and then merge the trained parameters with the original parameters of the large model. Since the parameters of the original model are not trained, only fewer parameters are needed to approach the effect of originally training all the parameters. The original parameters of the large language model are denoted as $P_o$, and the parameters of the low-rank matrix after training are denoted as $P_1$. The original parameters $P_o$ are merged with the parameters $P_1$ of the low-rank matrix. After merging, the overall parameters of the large language model are expressed as $P_u$, which can be expressed as follows: $P_u = P_o + P_1$.

The overall task of step S2 is to make the output $y_t$ of the trained large language model $L_t$ as close as possible to the given task x and the output content $y_{<t}$ before the output $y_t$, so as to maximize the output $y_t$. The overall optimization goal is shown as follows:

$$\max \sum_{x,y \in Z} \sum_{t=1}^{|y|} \log(P_u(y_t | x, y_{<t})).$$

S2.4. Acquisition of an Original Text Interaction Embedding Vector:

based on the text attribute key-value pair dictionary D constructed in step S1.2, the text attribute key-value pair dictionary D is input into the trained large language model Lt in step S2.2. Since the original structure of the large language model is a multilayer Transformer structure, referring to the structure of a Transformer model, the vector output by its embedding layer is taken as an attribute key-value embedding vector $E_d$ of D under the model encoding of model $L_t$. The process can be expressed by the following formula:

$$E_d = L_t(D);$$

This facilitates subsequent fine-tuning of the sequence model. Based on the data sequence Seq and the attribute key-value pair dictionary D in step S1.2, an embedding vector $E_{seq}$ is trained based on the sequence of the trained large language model $L_t$. The training process can be expressed as follows:

$$E_{seq} = L_t(Seq(D_1, D_2, \ldots, D_n));$$

Figure 4:
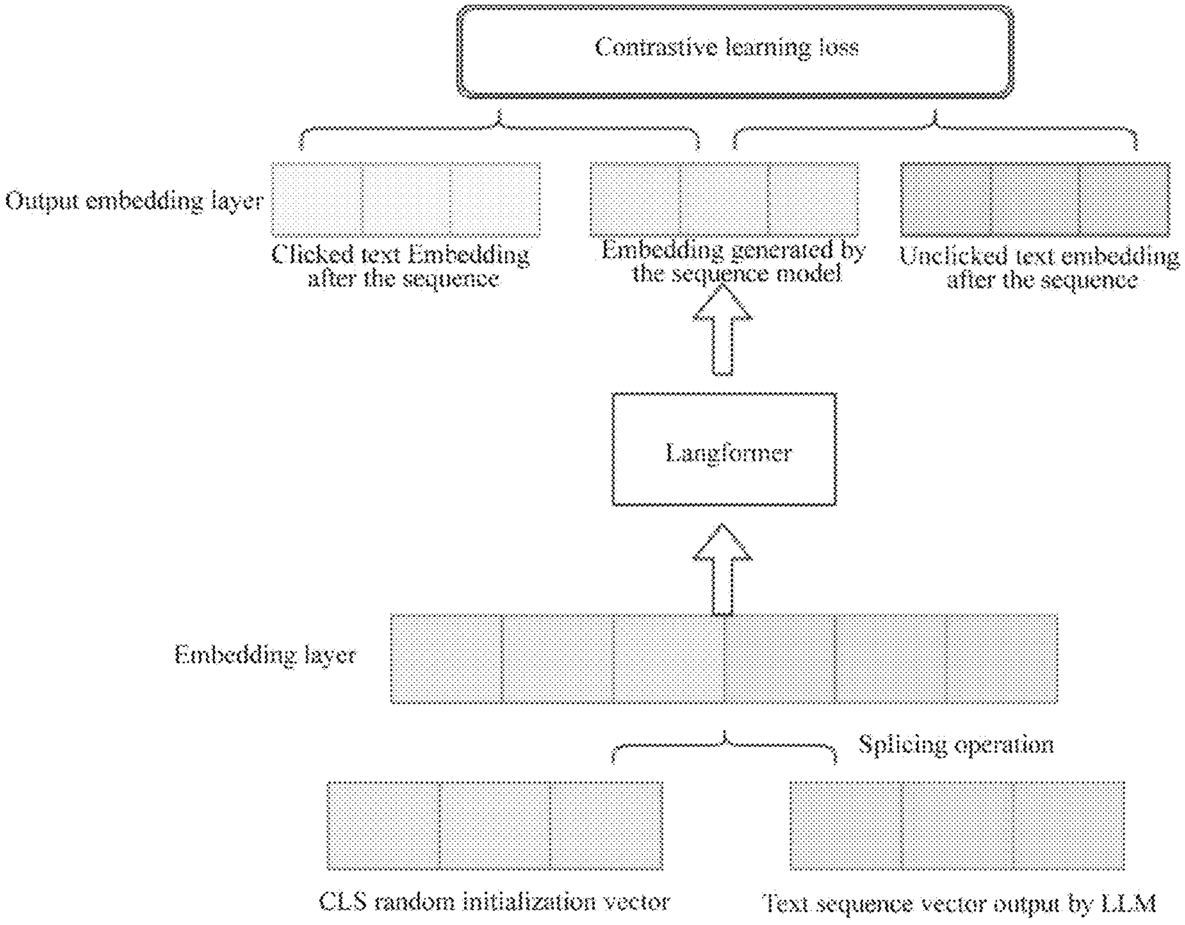
FIG. 4 is a schematic diagram of fine-tuning a sequence model according to this disclosure.
Figure 5:
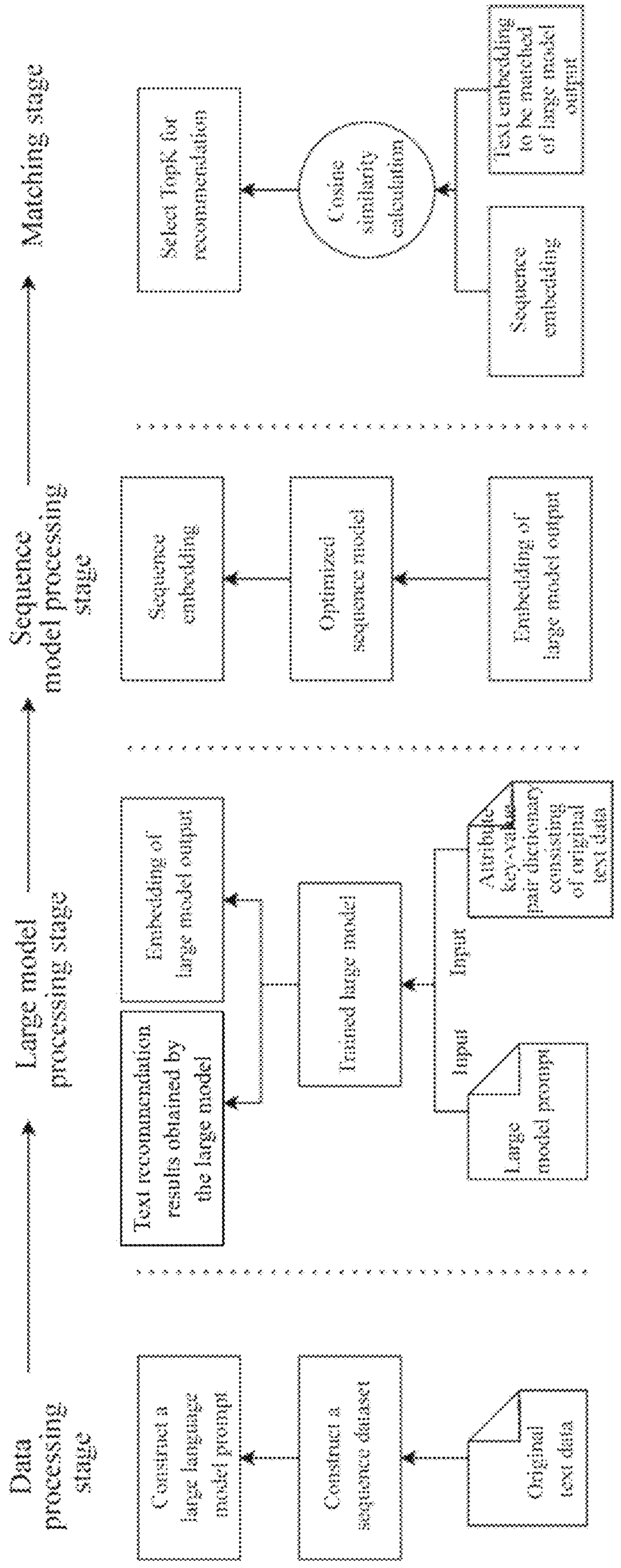
FIG. 5 is a schematic diagram of sequence recommendation result matching according to this disclosure.

S3. Fine-Tuning of a Sequence Model:

a sequence model of a sequence prediction task is fine-tuned based on the dataset constructed in step S1 using the text embedding vector output by the large language model trained in step S2 in order to align the sequence recommendation results at a finer level, thereby enhancing the sequence prediction information at the embedding vector level and reducing the impact of the large language model output hallucination on the final result. The overall process is as shown in FIG. 4.

S3.1. Initialization of a Sequence Model Tensor:

for the sequence model, in order to prevent an excessively long interaction sequence from affecting a calculation result and to improve the calculation efficiency of an attention mechanism, in this disclosure, Langformer is selected as the sequence model, which is similar to the traditional Transformer model in structure, but is optimized in attention layer mechanism, that is, a traditional self-attention module is converted into a sliding window attention module. The sliding window attention module stipulates that each token can only see w tokens in a set window, so its complexity is reduced from $O(n^2)$ of the traditional attention mechanism to O(n*w)w<<n. For the sequence model Langformer, the sequence model trained in step S2.3 is used as its initial embedding vector. Before the initial embedding vector, an initial embedding vector $E_{cls} \in \mathbb{R}^{n\times m}$ of a sequence identifier [CLS] is added, where n is the size of each training batch number, m is the vector dimension when initializing $E_{cls}$, and its value is randomly initialized. The final initialized model tensor $E_{init}$ can be expressed as:

$$Einit = Ecls \| Eseq;$$

The initialized vector is trained and fitted by Langformer to obtain the Langformer output vector $E_{final}$.

S3.2 Fine-Tuning of a Downstream Task Based on the Sequence Model:

for the sequence model, based on the tensor initialization in step S3.1, the downstream task is fine-tuned. The downstream task is mainly to output a matching score Score between the embedding vector $E_{final}$ output by the sequence model and the attribute key-value embedding vector trained in step S2.3. The fine-tuning training steps for each user $U_i$ are as follows:

Taking the embedding vector $E_{final}$ after training in step S3.1 as a reference vector;

Taking the interacted text attribute key-value pair dictionary $D_k$ of the user $U_i$ after training sequence, and the vector $E_{D_{pos}}$ obtained after training the large language model $L_t$ as positive samples of the reference vector $E_{final}$ for comparison;

Taking the non-interacted text attribute key-value pair dictionary $D_k$ of the user $U_i$ in all text data, and the vector obtained after training the large language model $L_t$ as negative samples of the reference vector $E_{final}$ for comparison; and Selecting one positive sample and h negative samples, constructing a contrastive learning loss function for learning, the contrastive learning loss function Le being shown as follows, where $\alpha_1$ is a perturbation factor:

$$L_c = -\min \sum\nolimits_{i=1}^{N} \left[ \|E_{final} - E_{D_{pos}}\|^2 - \|E_{final} - E_{D_{neg}}\|^2 + \alpha_1 \right].$$

The downstream task model here only needs to use a multilayer perceptron. In this disclosure, the downstream task model adopts a four-layer structure. Specifically, the first layer is a linear layer with a dimension space of $\mathbb{R}^{m\times n}$, where m and n are an input feature dimension size and an output feature dimension size, respectively; the second layer is a nonlinear layer with a tanh function as an activation function; the third layer is a linear layer with a dimension space of $\mathbb{R}^{n\times k}$, where k is the same as the dimension of the attribute key-value pair dictionary vector $E_D$ output in the large language model; and in the fourth layer, the scores of $E_{final}$ and $E_D$ are calculated, and a cross entropy Loss is transferred, which can be expressed as follows:

$$L_b = -\sum\nolimits_{i=1}^{n} (y_i \log(\hat{y}_i) + (1 - y_i) \log(1 - \hat{y}_i));$$

where n is the number of samples, $y_i$ is the actual click behavior, which is 1 if clicked, and is 0 if not clicked, and $\hat{y}_i$ is the prediction probability of the model output.

For the sequence model, the fine-tuned overall Loss function is: $L=L_b+L_c$.

S4. Sequence Recommendation Result Matching:

for users who need prediction, their historical interaction sequences are generated according to step S1, and prompt words are constructed; prompt word interaction is performed on the trained model in S2 to obtain output recommendation results; and then, the recommendation results are input into the sequence model to generate a final embedding text vector for retrieval, and matching is performed in a vector database based on the embedding text vector, and the K bits with the highest matching scores are output as the recommendation results.

S4.1. Sorting of Data to be Recommended:

for the text data to be recommended, the text data to be recommended is sorted into the attribute key-value pair form required for model input according to step S1.1, and a prompt use case required by the large model is constructed according to step S2.2.

S4.2. Large Model Reasoning:

the prompt use case sorted in step S4.1 is used to construct the prompt $Prompt_{final}$ as follows:

The following is a user interacted text content data sequence [Seq]. Please output the possible interacted text content in a format of {attribute key 1: attribute value 1, . . . , attribute key n: attribute value n}, take into account the content that may appear simultaneously with the interacted content, and avoid the content that cannot appear simultaneously.

{attribute key 1: attribute value 1, . . . , attribute key n: the attribute value n} is used as a text recommendation result output by the large language model, represented by $rep_{final}$, and is input into the large language model $L_t$ as input data to obtain its sequence embedding vector, represented as $E_{rep_{final}}$. Meanwhile, all the text data attribute key-value pair dictionaries D to be matched are input into the large language model $L_t$ to obtain their embedding vectors, represented as $E_D$, and the embedding vectors are stored in the vector database.

S4.3. Sequence Model Downstream Task Matching:

the large model output result $E_{rep_{final}}$ obtained in step S4.2, and the embedding vector set Cemd to be recommended are reasoned using the downstream task model to obtain its final representation embedding vector $E_{ult}$. A cosine similarity between the output result and the vector in the embedding vector set to be recommended is calculated, and k vectors with the highest similarity are selected for final text recommendation. The process can be expressed as follows:

$$Sim = \frac{E_{ult} \cdot E_D}{\|E_{ult}\| \cdot \|E_D\|} E_D \in C_{emb}$$

$$\text{Final}_{rep} = TopK(Sim)$$

$\text{Final}_{rep}$ in the above formula represents the final recommendation result.

According to this disclosure, a large language model is introduced into a text sequence recommendation task, so that text can be better modeled by utilizing rich pre-training corpus of the large language model; meanwhile, sequence modeling is performed on the text, the capability of sequence recommendation modeling in a large model is activated, an ID-based recommendation paradigm in a traditional recommendation algorithm is activated, and recommendation task learning processing is better performed in a cold start scenario and a knowledge transfer scenario; and finally, a recommendation result is finally optimized by a sequence model, so that the problem output results of previous large language models cannot be accurately matched due to hallucination can be solved.

This disclosure is described with reference to flowcharts and/or block diagrams of methods, apparatus (systems), and computer program products according to embodiments of this disclosure. It should be understood that each flow and/or block in the flowcharts and/or block diagrams, and combinations of flows and/or blocks in the flowcharts and/or block diagrams, can be implemented by computer program instructions. These computer program instructions can be provided to a processor of a general-purpose computer, a special-purpose computer, an embedded processor, or other programmable data processing device to produce a machine, so that the instructions executed by the processor of the computer or other programmable data processing device produce a device for implementing the functions specified in one or more processes in the flowchart and/or one or more blocks in the block diagram.

In the description of this disclosure, it should be understood that the terms "first" and "second" are used for descriptive purposes only and cannot be understood as indicating or implying relative importance or implicitly indicating the number of the indicated technical features. Therefore, features defined as "first" or "second" may explicitly or implicitly include one or more of the features. In the description of this disclosure, "plurality" means two or more, unless otherwise clearly defined.

Obviously, those skilled in the art can make various modifications and variations to this disclosure without departing from the spirit and scope of this disclosure. Thus, if these modifications and variations of this disclosure fall within the scope of the claims of this disclosure and their equivalents, this disclosure is intended to include these modifications and variations.

What is claimed is:

1. A text sequence recommendation method based on a large language model, comprising the following stages:

a data preprocessing stage: converting historical text sequence data clicked by a user into an attribute key-value pair set to construct a dataset for large model training;

a large language model pre-training stage: constructing the dataset into a prompt word training set for the large language model, and converting a sequence recommendation task into a natural language task and then model training is performed to obtain an optimal text sequence recommendation result at a semantic space level;

a sequence model fine-tuning stage: using Langformer as the sequence model, wherein the Langformer employs a sliding-window attention mechanism in which each token attends only to tokens within a predefined window, thereby reducing attention-computation complexity for a long interaction sequence from $O(n^2)$ to $O(n \cdot w)$, where w is smaller than n; initializing the sequence model based on an embedding vector generated by the large language model from a historical interaction sequence; and training and fitting the initialized embedding vector using the Langformer to generate a Langformer output vector $E_{final}$; and a matching stage: generating embedding vectors based on outputs of the large language model and the sequence model, performing matching in an embedding-vector space based on the embedding vectors, and generating a sequence recommendation result through vector fitting between the outputs of the large language model and the sequence model, wherein in the sequence model fine-tuning stage, a reference vector is selected, a vector trained by the large language model is used as a positive sample of the reference vector, and a vector not trained by the large language model is used as a negative sample of the reference vector; and based on the reference vector, according to the positive sample and the negative sample, by setting a perturbation factor, a contrastive learning Loss function is constructed for fine-tuning a downstream task so as to achieve vector fitting between the outputs of the large language model stage and the sequence model stage and thereby reduce an influence of large-language-model hallucination on a recommendation result, wherein the contrastive learning Loss function is expressed as:

$$L_c = -\min\sum_{i=1}^{N}\left[\left\|E_{final} - E_{D_{pos}}\right\|^2 - \left\|E_{final} - E_{D_{neg}}\right\|^2 + \alpha_1\right];$$

wherein, $E_{final}$ represents the reference vector, $E_{D_{pos}}$ represents the positive sample, $E_{D_{neg}}$ represents the negative sample, ai represents the perturbation factor, and Lc represents the contrastive learning Loss function.

2. The text sequence recommendation method based on a large language model according to claim 1, wherein:

in the data preprocessing stage, the historical text sequence data is processed by removing punctuation marks, removing HTML tags, removing stop words, removing redundant spaces, and performing word form restoration; and the processed data is constructed into a format including attribute keys and values, and is ranked in reverse order of interaction time, and an interaction sequence with more than 5 interactions is selected as the dataset.

3. The text sequence recommendation method based on a large language model according to claim 2, wherein:

in the large language model pre-training stage, a missing corpus prompt dataset is constructed by masking values in a certain sequence within the interaction sequence;

a contrastive learning prompt dataset is constructed according to user interacted text data and non-interacted text data; and the prompt word training set is constructed according to the fact that the missing corpus dataset and the contrastive learning prompt dataset are divided in a ratio of training set:

validation set: test set of 8:1:1.

4. The text sequence recommendation method based on a large language model according to claim 3, wherein:

in the large language model pre-training stage, a low-rank matrix is used as a supplement to fine-tuning parameters of a large model, and original parameters are merged with parameters of the low-rank matrix to form the overall parameters of the large language model for model training.

5. The text sequence recommendation method based on a large language model according to claim 4, wherein:

in the large language model pre-training stage, a goal of training the large model is:

$$\max\sum_{x,y\in Z}\sum_{t=1}^{|y|}\log(P_u(y_t \mid x, y_{<t}));$$

wherein, x represents the given task, $y_t$ is the large model output, $y_{<t}$ represents the output content between the large model output $y_t$, and $P_u$ represents the overall parameters of the large language model.

6. The text sequence recommendation method based on a large language model according to claim 1, wherein:

in the process of fine-tuning the downstream task, a multilayer perceptron is used as the downstream task and is transferred using a cross entropy Loss, where the cross entropy Loss is expressed as:

$$L_b = -\sum_{i=1}^{n}(y_i\log(\hat{y}_i) + (1 - y_i)\log(1 - \hat{y}_i));$$

wherein, n is the number of samples, $y_i$ is the actual click behavior, which is 1 if clicked, and is 0 if not clicked, and $\hat{y}_i$ is the prediction probability of the model output;

for the sequence model, the fine-tuned overall Loss function is: $L=L_b+L_c$.

7. The text sequence recommendation method based on a large language model according to claim 6, wherein:

in the matching stage, text data to be recommended is obtained, reasoning is performed by the large model to obtain an output result of the large model, the output result and an embedding vector set of the text data to be recommended are reasoned using a downstream task model, and final text recommendation is performed according to a cosine similarity between a reasoning result and a vector in the embedding vector set to be recommended.

8. A text sequence recommendation system based on a large language model, comprising:

one or more processors; and a memory storing instructions that, when executed by the one or more processors, cause the one or more processors to perform the text sequence recommendation method according to claim 1.

* * * * *